United States Patent
Sonntag et al.

(10) Patent No.: US 11,133,493 B2
(45) Date of Patent: Sep. 28, 2021

(54) ANODE FOR A LITHIUM-ION BATTERY CELL, PRODUCTION METHOD THEREOF AND BATTERY INCLUDING SAME

(71) Applicant: HUTCHINSON, Paris (FR)

(72) Inventors: Philippe Sonntag, Avon (FR); Julie Courtat, Pannes (FR); Marc Zimmermann, Achenheim (FR); Ksenia Astafyeva, Montargis (FR); Bruno Dufour, Champagne sur Seine (FR); David Ayme-Perrot, Huningue (FR)

(73) Assignee: Hutchinson, Paris (FR)

( * ) Notice: Subject to any disclaimer, the term of this patent is extended or adjusted under 35 U.S.C. 154(b) by 254 days.

(21) Appl. No.: 16/320,603

(22) PCT Filed: Jul. 21, 2017

(86) PCT No.: PCT/FR2017/052031
§ 371 (c)(1),
(2) Date: Jan. 25, 2019

(87) PCT Pub. No.: WO2018/020117
PCT Pub. Date: Feb. 1, 2018

(65) Prior Publication Data
US 2019/0165366 A1 May 30, 2019

(30) Foreign Application Priority Data
Jul. 26, 2016 (FR) ...................................... 1657155

(51) Int. Cl.
*H01M 4/133* (2010.01)
*H01M 4/04* (2006.01)
(Continued)

(52) U.S. Cl.
CPC ......... *H01M 4/133* (2013.01); *H01M 4/0471* (2013.01); *H01M 4/1393* (2013.01);
(Continued)

(58) Field of Classification Search
CPC ...... H01M 4/133; H01M 4/587; H01M 4/625; H01M 4/0471; H01M 4/1393;
(Continued)

(56) References Cited

U.S. PATENT DOCUMENTS 5,749,927 A    5/1998  Chern et al.
6,183,907 B1   2/2001  Barusseau et al.
(Continued)

FOREIGN PATENT DOCUMENTS

EP    1 489 673 B1    3/2008
EP    2 639 860 A1    9/2013
(Continued)

OTHER PUBLICATIONS

Therban 4307 technical data sheet (Year: NA).*
(Continued)

*Primary Examiner* — Matthew T Martin
(74) *Attorney, Agent, or Firm* — Alston & Bird LLP

(57) ABSTRACT

Polymer composition for an electrode, method, and a lithium-ion battery including same are provided. This composition includes an active material having a graphite usable in the anode, an electrically conductive filler and a cross-linked elastomer binder that includes a hydrogenated acrylonitrile butadiene copolymer (HNBR). The binder includes a non-hydrogenated acrylonitrile butadiene copolymer (NBR) and/or a HNBR with an acrylonitrile content that is at least 40% by weight and cross-linked by thermal oxidation. This method includes: a) mixing the active material, the binder in a non-cross-linked state and the electrically conductive filler, to obtain a precursor mixture of the composition, b) depositing the mixture on a metal current collector so that the mixture forms a non-cross-linked film, then c) thermal oxidation of the non-cross-linked film under an atmosphere containing oxygen at a temperature of between (Continued)

200 and 300° C., to obtain the electrode in which the binder is cross-linked.

16 Claims, 1 Drawing Sheet

(51) Int. Cl.
*H01M 4/1393* (2010.01)
*H01M 4/62* (2006.01)
*H01M 4/587* (2010.01)
*H01M 10/0525* (2010.01)

(52) U.S. Cl.
CPC .......... *H01M 4/587* (2013.01); *H01M 4/622* (2013.01); *H01M 4/625* (2013.01); *H01M 10/0525* (2013.01)

(58) Field of Classification Search
CPC ............... H01M 4/622; H01M 4/0404; H01M 10/0525; Y02E 60/10
See application file for complete search history.

(56) References Cited

U.S. PATENT DOCUMENTS

| | | | |
|---|---|---|---|
| 2006/0222952 A1* | 10/2006 | Kono | H01M 4/5825 429/231.95 |
| 2010/0112441 A1 | 5/2010 | Fukumine et al. | |
| 2013/0244098 A1* | 9/2013 | Voillequin | H01M 4/622 429/188 |
| 2016/0340476 A1 | 11/2016 | Sonntag et al. | |

FOREIGN PATENT DOCUMENTS

| | | |
|---|---|---|
| FR | 2 766 969 A1 | 2/1999 |
| WO | WO 2015/064099 A1 | 5/2015 |
| WO | WO 2015/124835 A1 | 8/2015 |

OTHER PUBLICATIONS

ASTM D5902—05 (Year: 2015).*
International Search Report and Written Opinion for Application No. PCT/FR2017/052031 dated Sep. 13, 2017, 13 pages.

* cited by examiner

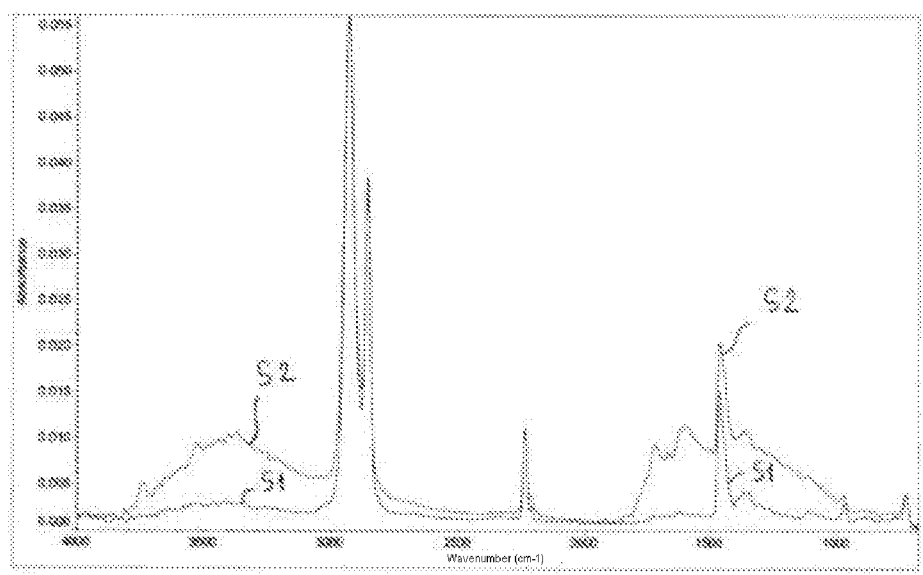

ANODE FOR A LITHIUM-ION BATTERY CELL, PRODUCTION METHOD THEREOF AND BATTERY INCLUDING SAME

FIELD

The present invention relates to a polymeric composition for an electrode that is capable of forming a lithium-ion battery anode, to a process for preparing this composition, to such an electrode and to a lithium-ion battery in which the or each cell incorporates this electrode.

BACKGROUND

Two main types of lithium accumulator batteries exist: lithium metal batteries, in which the negative electrode is composed of lithium metal (material which poses safety problems in the presence of a liquid electrolyte), and lithium-ion batteries, in which the lithium remains in ionic form.

Lithium-ion batteries are constituted of at least two conductive faradic electrodes of different polarities, the negative electrode or anode and the positive electrode or cathode, between which electrodes is a separator which is constituted of an electrical insulator soaked with an aprotic electrolyte based on $Li^+$ cations ensuring the ion conductivity. The electrolytes used in these lithium-ion batteries are usually constituted of a lithium salt, for example of formula $LiPF_6$, $LiAsF_6$, $LiCF_3SO_2$ or $LiClO_4$ which is dissolved in a mixture of nonaqueous solvents such as acetonitrile, tetrahydrofuran or, most commonly, a carbonate, for example ethylene or propylene carbonate.

A lithium-ion battery is based on the reversible exchange of the lithium ion between the anode and the cathode during charging and discharging of the battery, and it has a high energy density for a very low mass by virtue of the physical properties of lithium.

The active material of the anode of a lithium-ion battery is designed to be the site of reversible insertion/deinsertion of lithium and is typically constituted of graphite (capacity of 370 mAh/g and redox potential of 0.05 V relative to the $Li^+/Li$ couple) or, as a variant, mixed metal oxides, among which are listed lithiated titanium oxides of formula $Li_4Ti_5O_{12}$, for example. As regards the active material of the cathode, it is usually constituted of a transition metal oxide or a lithiated iron phosphate. These active materials thus allow reversible insertion/deinsertion of lithium in electrodes, and the higher their mass fractions therein, the greater the capacity of the electrodes.

These electrodes must also contain an electrically conductive compound, such as carbon black, and, to give them sufficient mechanical cohesion, a polymeric binder.

The anodes of lithium-ion batteries are usually manufactured via a process successively comprising a step of dissolving or dispersing the ingredients of the anode in a solvent, a step of spreading the solution or dispersion obtained on a metal current collector, and finally a step of evaporating the solvent. Processes using an organic solvent (such as the process presented in US-A1-2010/0112441) have drawbacks in the environmental and safety fields, in particular due to the fact that it is necessary to evaporate large amounts of these solvents that are toxic or flammable. As regards processes using an aqueous solvent, their major drawback is that the anode must be very rigorously dried before it can be used, since traces of water limit the service life of lithium batteries. Mention may be made, for example, of EP-B1-1 489 673 for the description of a process for manufacturing an anode based on graphite and an elastomeric binder and using an aqueous solvent.

It has thus been sought in the past to manufacture lithium-ion battery anodes without using solvents, especially via melt implementation techniques (for example by extrusion). Unfortunately, these melt processes give rise to major difficulties in the case of these batteries which require a mass fraction of active material in the polymeric mixture of the anode of at least 85% in order for said anode to have a sufficient capacity in the battery. Now, at such contents of active material, the viscosity of the mixture becomes very high and entails risks of overheating of the mixture and loss of mechanical cohesion after its implementation. U.S. Pat. No. 5,749,927 presents a process for the continuous preparation by extrusion of lithium-polymer battery electrodes, which comprises mixing of the electrode active material with an electrical conductor and a solid electrolyte composition comprising a polymer, a lithium salt and a propylene carbonate/ethylene carbonate mixture in large excess relative to this polymer. In said document, the mass fraction of active material present in the anode polymeric composition obtained is less than 70%, which is largely insufficient for a lithium-ion battery.

EP-A1-2 639 860 in the name of the Applicant proposes an anode composition for a lithium-ion battery prepared via a melt route and without evaporation of solvent, which makes it possible to increase the mass fraction of active material in the anode, thus giving high performance to the lithium-ion battery incorporating it. The anode compositions presented in said document comprise:

an active material (e.g. a graphite) in a mass fraction of greater than 85%,
an electrically conductive filler,
a crosslinked elastomeric binder constituted, for example, of a hydrogenated acrylonitrile-butadiene copolymer (HNBR) "THERBAN 4307" which is fully saturated (i.e. defined by a residual content of double bonds at most equal to 0.9%) and having a mass content of acrylonitrile-based units equal to 43%,
a radical crosslinking system for the elastomeric binder comprising a peroxide, and
a nonvolatile organic compound (e.g. alkene carbonate) which may be used in the electrolyte solvent of the battery.

WO-A2-2015/124835, also in the name of the Applicant, presents an electrode (e.g. anode) composition for a lithium-ion battery prepared via a melt route and without evaporation of solvent, using a sacrificial polymeric phase which is mixed with an active material, a crosslinked or non-crosslinked elastomeric binder and a conductive filler, which is then at least partially removed, for example by thermal decomposition, which makes it possible to obtain improved plasticization and fluidity during the implementation of the molten mixture, despite a mass fraction of active material that may be used in the composition of greater than 80%, and a controlled porosity of said composition, giving it a satisfactory electrode capacity. This composition may comprise as binder an HNBR (e.g. Zetpol® 2010L, which is a partially saturated HNBR with a mass content of acrylonitrile-based units of 36%, a degree of hydrogenation of 96% and an iodine number of 11%, measured according to the standard ASTM D5902-05).

The anode compositions presented in the last two documents are satisfactory overall for a lithium-ion battery, but the Applicant has sought in its recent research to further improve their electrochemical properties.

SUMMARY

One aim of the present invention is thus to propose a novel anode polymeric composition containing an active material which comprises a graphite that can be used in a lithium-ion battery anode in a very high mass fraction while at the same time being capable of giving the anode an improved capacity and improved cyclability, and this aim is achieved insofar as the Applicant has just discovered, surprisingly, that if this active material and an electrically conductive filler are mixed with an elastomeric binder which comprises at least one non-hydrogenated acrylonitrile-butadiene copolymer (NBR) and/or at least one HNBR each having a mass content of acrylonitrile-based units (abbreviated as mass content of ACN) of greater than or equal to 40% and crosslinked via thermal oxidation, under an atmosphere comprising oxygen at a partial pressure of oxygen of greater than $10^4$ Pa (0.1 bar) and at a temperature of between 200° C. and 300° C., then it is possible to obtain, either via a liquid route or via a melt route, an anode which has capacities at five and ten cycles markedly greater than 200 mAh/g of anode, with a degree of retention after five or ten cycles relative to the first cycle which is markedly greater than 80% (or even greater than 90% and even 100%).

Specifically, the Applicant has discovered that the oxygen used for this thermal oxidation interacts at high temperature with the nitrile groups —C≡N of the or of each copolymer (groups which are much more numerous than the double bonds of the butadiene-based units, given the very high mass content of ACN) to partially oxidize/dehydrate these nitrile groups, enriching them in oxygen atoms and depleting them in hydrogen atoms, which makes it possible to form carbon bridges between the polymer chains of the or of each copolymer and thus to crosslink it.

Thus, a polymeric composition for an electrode that is capable of forming a lithium-ion battery anode according to the invention, the composition comprising an active material which comprises a graphite that is capable of undergoing reversible insertion/deinsertion of lithium in said anode, an electrically conductive filler and a crosslinked elastomeric binder which comprises a hydrogenated acrylonitrile-butadiene copolymer (HNBR), is such that said crosslinked binder comprises at least one non-hydrogenated acrylonitrile-butadiene copolymer (NBR) and/or at least one "HNBR" which each have a mass content of ACN of greater than or equal to 40% and which is (are) each crosslinked via thermal oxidation.

BRIEF DESCRIPTION OF THE DRAWING

FIG. 1 is a spectra of a film before and after annealing.

DETAILED DESCRIPTION

The expression "binder comprising at least one NBR and/or at least one HNBR" means herein that said binder may comprise one or more NBRs and/or one or more HNBRs, each satisfying the twofold condition of having this very high mass content of ACN and of being crosslinked—exclusively or at least partly—via a chemical thermal oxidation reaction in the presence of oxygen atoms from the thermo-oxidizing atmosphere interacting with the nitrile groups.

In general, the crosslinked NBR and/or HNBR elastomers included in a composition according to the invention may be functionalized or non-functionalized elastomers, it being understood that it is possible to functionalize these NBR and/or HNBR elastomers with functional groups that are suitable for giving the electrode composition according to the invention improved properties (e.g. adhesion), for instance carbonyl groups (e.g. carboxyl, for the production of carboxylated NBRs, also known as XNBRs), in a non-limiting manner.

It will be noted that this crosslinking by thermal oxidation differs from the radical crosslinking with peroxide used especially in EP-A1-2 639 860 to crosslink the HNBR binder, and that this specific crosslinking is reflected structurally for the composition of the invention by the fact that it may be advantageously free of any crosslinking system, such as a radical crosslinking system, for example with peroxide, given that the active sites for the crosslinking by thermal oxidation are provided by the oxygen of the surrounding atmosphere interacting specifically with the nitrile groups of the NBR and/or HNBR.

As indicated above, it will be noted as a variant of this exclusive crosslinking of said at least one NBR and/or of said at least one HNBR via thermal oxidation, that it is also possible to crosslink it (them) partly via a radical route (e.g. by incorporating a peroxide crosslinking system into the composition) in addition to the crosslinking afforded by said thermal oxidation.

Advantageously, said crosslinked binder thus comprises the product of a thermal oxidation chemical reaction, under an atmosphere comprising oxygen at a partial pressure of oxygen of greater than $10^4$ Pa and at a temperature of between 200° C. and 300° C., of said at least one NBR and/or of said at least one HNBR in non-crosslinked form, of said active material and of said electrically conductive filler with the oxygen of said atmosphere.

It will be noted that the thermal oxidation according to the invention modifies the initial non-crosslinked composition (or crosslinkable composition in the absolute sense, if the composition incorporates a crosslinking system), for the production of a final crosslinked composition by chemical reaction with oxygen of said at least one NBR and/or of said at least one HNBR which is (are) non-crosslinked or cross-linkable.

As explained above, said acrylonitrile-based units borne by said at least one NBR and/or said at least one HNBR which is (are) crosslinked in the crosslinked composition according to the invention are at least partially enriched in oxygen atoms and depleted in hydrogen atoms, via said thermal oxidation.

Preferably, said mass content of ACN in said at least one NBR and/or said at least one HNBR is greater than or equal to 44% and even more preferentially greater than or equal to 48%.

Also preferably, said crosslinked binder comprises a mass fraction inclusively between 70% and 100% of said at least one NBR and/or of said at least one HNBR, said crosslinked binder being present in the composition in a mass fraction of less than 5%, preferably less than or equal to 4%.

According to one example of implementation of the invention, said crosslinked binder comprises at least one HNBR which has:

an iodine number, measured according to the standard ASTM D5902-05, of greater than 10%, advantageously greater than 15% and even more advantageously greater than 20%, and a degree of hydrogenation of less than 95% and advantageously less than 92% (measured by infrared spectroscopy).

It will be noted that this iodine number (also known as the iodine value and by definition representing cg of iodine per g of HNBR) measured according to said standard (reapproved in 2010 and in 2015) indicates a content of residual unsaturations that may be relatively high for the HNBR according to the invention, which is witnessed by the fact that this HNBR is partially hydrogenated and is thus of partially saturated grade (unlike the abovementioned "THERBAN 4307" HNBR of EP-A1-2 639 860).

It will be noted, however, that the HNBR according to the invention may be, as a variant, of totally saturated and hydrogenated grade, i.e. having an iodine number of less than 10% and a degree of hydrogenation of close to 100%.

Advantageously, said crosslinked binder may comprise a mixture of said at least one NBR and of said at least one HNBR (which each have said mass content of ACN of greater than or equal to 40% and which are both crosslinked via said thermal oxidation, as explained above).

It will be noted that the homogeneous distribution in the composition of said crosslinked elastomeric binder gives the electrode mechanical strength.

According to another characteristic of the invention, the composition according to the invention may advantageously comprise:

in a mass fraction of greater than 90%, said active material comprising said graphite which is of artificial or natural type, e.g. the artificial graphite C-NERGY® L-SERIES (Timcal) or graphite of one of the series PGPT100, PGPT200, PGPT20 (Targray), and in a mass fraction of between 1% and 6%, said electrically conductive filler chosen from the group constituted by carbon blacks, graphites, expanded graphites, carbon fibers, carbon nanotubes, graphenes, and mixtures thereof, preferably chosen from purified conductive expanded graphites, high-purity carbon blacks and carbon nanofibers.

It will be noted that this very high mass fraction of said active material in the electrode composition gives the lithium-ion battery incorporating it high performance.

Advantageously, said composition of the invention may be free of any nonvolatile organic compound (i.e. compound with a boiling point of greater than 150° C. at atmospheric pressure of $1.013 \times 10^5$ Pa), such as an alkene carbonate, in contrast with the teaching of the abovementioned EP-A1-2 639 860.

An electrode according to the invention is capable of forming a lithium-ion battery anode, and is characterized in that the electrode comprises at least one film constituted of said polymeric composition defined above, and a metal current collector in contact with said at least one film.

A lithium-ion battery according to the invention comprises at least one cell including an anode, a cathode and an electrolyte based on a lithium salt and a nonaqueous solvent, and this battery is characterized in that said anode is constituted of this electrode of the invention.

Advantageously, the cathode of this battery may be based on an active material comprising at least one lithiated polyanionic compound or complex with an operating voltage of less than 4 V and preferably coated with carbon, such as a lithiated phosphate of a metal M of formula $LiMPO_4$ in which M is, for example, an iron atom.

A process according to the invention for preparing said polymeric composition defined above successively comprises:

a) mixing of ingredients of the composition comprising said active material, said elastomeric binder in non-crosslinked form and said electrically conductive filler, to obtain a precursor mixture of said composition, b) deposition of said mixture on a metal current collector so that said mixture forms a non-crosslinked film, and then c) thermal oxidation of said non-crosslinked film under an atmosphere comprising oxygen at a partial pressure of oxygen of greater than $10^4$ Pa and at a temperature of between 200° C. and 300° C., to obtain said electrode in which said binder is crosslinked.

According to a first embodiment of the invention, the following are performed:

step a) by liquid-route grinding of said ingredients dissolved or dispersed in a solvent, step b) by coating using a doctor blade, and step c), after evaporation of said solvent following step b), by annealing said film at a temperature of between 200 and 300° C.

According to a second embodiment of the invention, the following are performed:

step a) by melt-route mixing of said ingredients and without evaporation of solvent, said ingredients also comprising a sacrificial polymeric phase in a mass fraction in said mixture of greater than or equal to 28%;

step b) by calendering, and step c) by decomposition, at said temperature of between 200 and 300° C., of said sacrificial polymeric phase having a thermal decomposition temperature which is at least 20° C. below that of said binder, to at least partially remove said sacrificial polymeric phase.

Advantageously, said sacrificial polymeric phase may comprise at least one sacrificial polymer chosen from polyalkene carbonates and may be present in said mixture in a mass fraction of between 30% and 50%, and step a) may be performed in an internal mixer or an extruder without macro-phase separation between said binder and said sacrificial polymeric phase in said mixture, in which said binder is homogeneously dispersed in said sacrificial polymeric phase which is continuous or else forms a co-continuous phase with said phase.

Reference may advantageously be made to the teaching of the abovementioned WO-A1-2015/124835 for the implementation of this second embodiment of the invention, it being pointed out that the process according to this second embodiment makes it possible to control the porosity within the composition via the amount of sacrificial phase introduced, by controlling it in terms of size, amount and morphology of the pores, and affords short implementation times, typical of conventional plastics engineering processes, for instance extrusion.

In general, it is possible to add to the compositions of the invention specific additives so as to improve or optimize their manufacturing process. It is also possible to add compounds allowing crosslinking of the binder and also coagents that are capable of aiding the crosslinking and homogenization thereof. Mention may be made, for example, of organic peroxides as crosslinking agent and of triallyl cyanurate as coagent. Crosslinking ensures the cohesion of the composition as a function of the nature of the binder. It will be noted that the use of a crosslinking agent and coagent is useful but not necessary for the invention.

Other characteristics, advantages and details of the present invention will emerge on reading the following description of several examples of implementation of the invention, which are given as nonlimiting illustrations in relation with the attached drawing, in which:

the single FIGURE is a graph illustrating the absorbance spectra measured by Fourier transform infrared spectroscopy (abbreviated as FTIR) showing the change in absorbance as a function of the wavenumber of two elastomeric films constituted of an HNBR binder, of which one is a non-crosslinked "control" film and the other is crosslinked according to the invention via thermal oxidation.

"Control" Examples, not in Accordance with the Invention, and Examples According to the Invention of Lithium-Ion Battery Anodes Prepared Via a Liquid Route The following were used in all of the examples that follow:

- as active material, an artificial graphite known as C-NERGY® L-SERIES (Timcal);
- as conductive filler, a purified conductive expanded graphite;
- as solvent, N-methylpyrrolidinone (NMP) from Aldrich;
- the following two NBR binders from Versalis ENI:
  Europrene N 3360 with a mass content of ACN of 33%, and
  Europrene N 4560 with a mass content of ACN of 45%;
- the following three HNBR binders from Zeon Chemicals L. P.:
  Zetpol® 4310, with a mass content of ACN of 19%, an iodine number of 15 and a degree of hydrogenation (HYD) of 95%,
  Zetpol® 2010L with a mass content of ACN of 36%, an iodine number of 11 and a degree of hydrogenation (HYD) of 96%,
  Zetpol® 0020 with a mass content of ACN of 50%, an iodine number of 23 and a degree of hydrogenation (HYD) of 91%.

Protocol for the Liquid-Route Implementation of the Anodes:

Li-ion battery anodes were manufactured by mixing these ingredients in a ball mill, followed by coating the dispersion obtained after mixing onto a metal strip forming a current collector, subsequent drying and finally optional crosslinking of the anodes obtained according to the invention by annealing.

The active material, the conductive filler and the binder (dissolved in NMP at a mass ratio of 1/10) were first mixed in the NMP by grinding in a ball mill for 3 minutes at 350 rpm.

The dispersions obtained were then coated on a bare copper strip 12 µm thick, using a doctor blade with a 150 µm aperture. After evaporating off the solvent at 60° C. for 2 hours, the coated films were annealed at 240° C. for 30 minutes for the anode according to the invention (an anode not in accordance with the invention was obtained without this final annealing). A final anode thickness ranging from 50 µm to 100 µm was obtained.

Table 1 below details the formulations of the compositions used in the initial dispersions and in the anodes finally obtained (mass fractions in %).

TABLE 1

|  | Initial dispersion | Final anode |
|---|---|---|
| Control example | C1 | |
| Active material: graphite | 38.3 | 95.9 |
| Conductive filler: expanded graphite | 0.4 | 1.0 |
| Binder: HNBR (Zetpol ® 2010L) | 1.2 | 3.1 |
| NMP | 60.1 | 0 |
| Dicumyl peroxide (% relative to the binder) | 3.0 | |
| TAC 70 on silica (% relative to the binder) | 3.0 | |
| Control example | C2 | |
| Active material: graphite | 38.0 | 94.0 |
| Conductive filler: expanded graphite | 1.2 | 3.0 |
| Binder: HNBR (Zetpol ® 4310) | 1.2 | 3.0 |
| NMP | 59.6 | 0 |
| Example according to the invention Example not in accordance with the invention | I1 (with final annealing at 240°) C3 (without final annealing) | |
| Active material: graphite | 38.0 | 94.0 |
| Conductive filler: expanded graphite | 1.2 | 3.0 |
| Binder: HNBR (Zetpol ® 0020) | 1.2 | 3.0 |
| NMP | 59.6 | 0 |
| Control example | C4 | |
| Active material: graphite | 32.9 | 90.0 |
| Conductive filler: expanded graphite | 2.6 | 7.0 |
| Binder: HNBR (Zetpol ® 2010L) | 1.1 | 3.0 |
| NMP | 63.4 | 0 |
| Dicumyl peroxide (% relative to the binder) | 9.0 | |
| TAC 70 on silica (% relative to the binder) | 8.2 | |
| Control example | C5 | |
| Active material: graphite | 38.0 | 94.05 |
| Conductive filler: expanded graphite | 1.2 | 2.95 |
| Binder: HNBR (Zetpol ® 2010L) | 1.2 | 3.0 |
| NMP | 59.6 | 0 |
| Control example | C6 | |
| Active material: graphite | 38 | 94 |
| Conductive filler: expanded graphite | 1.2 | 3 |
| Binder: NBR (Europrene N 3360) | 1.2 | 3 |
| NMP | 59.6 | 0 |
| Example not in accordance with the invention | C7 | |
| Active material: graphite | 38 | 94 |
| Conductive filler: expanded graphite | 1.2 | 3 |
| Binder: NBR (Europrene N 4560) | 1.2 | 3 |
| NMP | 59.6 | 0 |
| Example not in accordance with the invention | C8 | |
| Active material: graphite | 38 | 94 |
| Conductive filler: expanded graphite | 1.2 | 3 |
| Binder: NBR (Europrene N 4560) | 1.2 | 3 |
| NMP | 59.6 | 0 |
| Dicumyl peroxide (% relative to the total binder) | 9.0 | |
| Example according to the invention Example not in accordance with the invention | I2 (with final annealing at 240° C.) C9 (without final annealing) | |
| Active material: graphite | 38 | 94 |
| Conductive filler: expanded graphite | 1.2 | 3 |
| Binder: HNBR (Zetpol ® 0020) | 0.6 | 1.5 |
| Binder: NBR (Europrene N 4560) | 0.6 | 1.5 |
| NMP | 59.6 | 0 |
| Dicumyl peroxide (% relative to the total binder) | 9.0 | |

It will be noted that:

the control anode C1 comprises an HNBR binder not in accordance with the invention and was crosslinked exclusively by final annealing (thermal oxidation at 240° C.), the control anode C2 comprises another HNBR binder not in accordance with the invention and was crosslinked exclusively by final annealing (thermal oxidation at 240°, the anode C3 not in accordance with the invention was prepared with the same formulation as the anode I1 according to the invention, although it differs from the latter anode by the absence of final crosslinking by annealing. In other words, I1 comprises, like C3, an HNBR according to the invention, but only I1 was crosslinked (exclusively by thermal oxidation at 240° C.), the control anode C4 comprises an HNBR binder not in accordance with the invention and was crosslinked both via a radical route and by thermal oxidation at 240° C., the control anode C5 comprises this same HNBR binder not in accordance with the invention and was crosslinked exclusively by thermal oxidation at 240° C., the control anode C6 comprises an NBR binder not in accordance with the invention and was not crosslinked, the anode C7 not in accordance with the invention comprises an NBR binder according to the invention and was not crosslinked, the anode C8 not in accordance with the invention comprises this same NBR binder according to the invention and was crosslinked exclusively via a radical route, and the anode C9 not in accordance with the invention was prepared with the same formulation as the anode I2 according to the invention, although it differs from the latter anode by the absence of final crosslinking by annealing.

More precisely, I2 comprises, like C9, a mixture of binders according to the invention NBR+HNBR, each according to the invention, but only I2 was partly crosslinked by thermal oxidation at 240° C. (and also via a radical route) since C9 was crosslinked exclusively via a radical route.

"Control" Examples and Examples According to the Invention of Lithium-Ion Battery Anodes Prepared Via a Melt Route:

The following were used in all of the examples that follow:

as active material, the abovementioned artificial graphite known as C-NERGY® L-SERIES (Timcal), as conductive filler, the abovementioned purified conductive expanded graphite, and as sacrificial polymeric phase, a blend of the two sacrificial polymers (polypropylene carbonates, abbreviated as PPC) Converge® Polyol 212-10 from Novomer and QPAC® 40 from Empower Materials.

The abovementioned HNBR binder Zetpol® 2010L (acrylonitrile content of 36%, iodine number of 11) was used in the "control" examples.

The abovementioned HNBR binder Zetpol® 0020 (acrylonitrile content of 50%, iodine number of 23) was used in the examples according to the invention.

Protocol for the Melt-Route Implementation of the Anodes:

The anodes based on said graphite were implemented via a melt route using a Haake Polylab OS internal mixer with a capacity of 69 cm$^3$ and at a temperature of between 60° C. and 75° C.

The mixtures thus obtained were calendered at room temperature using a Scamex external roll mixer until an anode thickness of 200 μm was reached, and they were then calendered again at 50° C. to reach a thickness of 50 μm. The films obtained were deposited on a copper collector using a sheet calender at 70° C.

The anodes obtained were placed in an oven so as to extract the sacrificial phase therefrom (solid and liquid PPC). They were subjected to a temperature ramp from 50° C. to 250° C. and then to an isotherm of 30 minutes at 250° C.

Table 2 below details the formulations of the compositions used before and after extraction of the sacrificial phase (% mass fractions).

TABLE 2

| | Before extraction | After extraction |
|---|---|---|
| Control example | | C'1 |
| Binder: HNBR (Zetpol ® 2010L) | 3.6 | 6 |
| Conductive filler: expanded graphite | 0.6 | 1 |
| Sacrificial polymer: Polyol 212-10 | 26.1 | 0 |
| Sacrificial polymer: QPAC 40 | 14.0 | 0 |
| Active material: graphite | 55.7 | 93 |
| Example according to the invention | | I'1 |
| Binder: HNBR (Zetpol ® 0020) | 1.8 | 3 |
| Conductive filler: expanded graphite | 1.8 | 3 |
| Sacrificial polymer: Polyol 212-10 | 25.6 | 0 |
| Sacrificial polymer: QPAC 40 | 13.8 | 0 |
| Active material: graphite | 57.0 | 94 |
| Control example | | C'2 |
| Binder: HNBR (Zetpol ® 2010L) | 1.8 | 3 |
| Conductive filler: expanded graphite | 1.8 | 3 |
| Sacrificial polymer: Polyol 212-10 | 25.6 | 0 |
| Sacrificial polymer: QPAC 40 | 13.8 | 0 |
| Active material: graphite | 57.0 | 94 |
| Example according to the invention | | I'2 |
| Binder: HNBR (Zetpol ® 0020) | 2.05 | 3 |
| Conductive filler: expanded graphite | 2.05 | 3 |
| Sacrificial polymer: Polyol 212-10 | 20.80 | 0 |
| Sacrificial polymer: QPAC 40 | 11.20 | 0 |
| Active material: graphite | 63.90 | 94 |
| Control example | | C'3 |
| Binder: HNBR (Zetpol ® 2010/L) | 2.25 | 3 |
| Conductive filler: expanded graphite | 2.25 | 3 |
| Sacrificial polymer: Polyol 212-10 | 16.30 | 0 |
| Sacrificial polymer: QPAC 40 | 8.80 | 0 |
| Active material: graphite | 70.40 | 94 |

It will be noted that all of the anodes C'1, C'2, C'3 and I'1 and I'2 obtained were crosslinked exclusively via thermal oxidation according to the invention, but that only I'1 and I'2 comprise a binder according to the invention.

Protocol for the Electrochemical Characterization of the Anodes C1-C9 and I1 and I2 Prepared Via a Liquid Route and of the Anodes C'1-C'3 and I'1 and I'2 Prepared Via a Melt Route:

The anodes C1-C9, I1, I2 and C'1-C'3, I'1 and I'2 were cut out using a punch (diameter 16 mm, area 2.01 cm$^2$) and weighed. The mass of active material was determined by subtracting the mass of the bare current collector prepared under the same conditions (heat treatments). They were placed in an oven directly connected to a glovebox. They were dried at 100° C. under vacuum for 12 hours and were then transferred into the glovebox (argon atmosphere: 0.1 ppm $H_2O$ and 0.1 ppm $O_2$).

The button cells (CR1620 format) were then assembled using a lithium metal counterelectrode, a Cellgard 2500 separator and an LiPF6 EC/DMC (50/50 mass ratio) battery-grade electrolyte. The cells were characterized on a Biologic VMP3 potentiostat, by performing charging/discharging cycles at constant current between 1 V and 10 mV. The regime was C/5 considering the mass of active material and a theoretical capacity of 372 mAh/g. In order to compare the performance of the various systems, the capacities (expressed as mAh/g of anode) during the first discharging for the deinsertion of lithium (initial capacity after the first cycle), on the fifth discharging (capacity at five cycles) and on the tenth discharging (capacity at 10 cycles) were evaluated. The degree of retention R (%) for the ratio of the capacity at 10 cycles to the capacity at the first cycle was also calculated.

Table 3 below gives the results for this characterization.

TABLE 3

| Anodes | Initial capacity (mAh/g) | Capacity at 5 cycles (mAh/g) | Capacity at 10 cycles (mAh/g)-R (%) |
|---|---|---|---|
| C1 (crosslinked by thermal oxidation via annealing) | 100 | 80 | 60-60% |
| C2 (crosslinked by thermal oxidation via annealing) | 240 | 150 | 150-62% |
| C3 (not crosslinked) | 100 | 85 | 85-85% |
| I1 (crosslinked by thermal oxidation via annealing) | 250 | 230 | 225-90% |
| C4 (crosslinked via a radical route and by thermal oxidation via annealing) | 210 | 160 | 150-71% |
| C5 (crosslinked by thermal oxidation via annealing) | 220 | 140 | 140-64% |
| C6 (not crosslinked) | 180 | 90 | 60-33% |
| C7 (not crosslinked) | 170 | 130 | 90-53% |
| C8 (crosslinked via a radical route) | 150 | 125 | 105-70% |
| C9 (crosslinked via a radical route) | 110 | 100 | 100-91% |
| I2 (crosslinked via a radical route and by thermal oxidation via annealing) | 240 | 250 | 250-104% |
| C'1 (crosslinked by thermal oxidation) | 120 | 100 | 95-79% |
| I'1 (crosslinked by thermal oxidation) | 200 | 210 | 210-105% |
| C'2 (crosslinked by thermal oxidation) | 110 | 120 | |
| I'2 (crosslinked by thermal oxidation) | 220 | 240 | 240-109% |
| C'3 (crosslinked by thermal oxidation) | Does not adhere to the collector | | |

Table 3 shows that the anodes I1 and I2 prepared via a liquid route according to the first embodiment of the invention, i.e. for which the binder is an HNBR with an ACN content of at least 40% and which was crosslinked by thermal oxidation in air at 240° C., each have a capacity markedly greater than 200 mAh/g of anode even after five and ten cycles (capacity even greater than 220 mAh/g), and also a cyclability of close to 100% between the first and tenth cycles. These satisfactory results for anodes I1 and I2 are in contrast with the insufficient results obtained for the anodes C1 to C9 and demonstrate the synergistic effect between the high content of ACN according to the invention in the NBRs and/or HNBRs tested and crosslinking by thermal oxidation, especially by comparison with:

the anodes C1, C2, C4 and C5 also crosslinked by thermal oxidation but not with this high content of ACN in the HNBR, the anodes C3 and C7 not in accordance with the invention (capacity of less than or equal to 130 mAh/g from the fifth to the tenth cycle) comprising an HNBR or NBR binder with a high content of ACN but not crosslinked, and the anodes C8 and C9 comprising an NBR binder with a high content of ACN but exclusively crosslinked via a radical route.

Furthermore, the anode I2 according to the invention shows an additional synergistic effect afforded by the mixture of binders NBR+HNBR both with a high content of ACN and crosslinked by thermal oxidation in comparison with the anode I1 only comprising an HNBR as binder (see the higher capacities and cyclability).

It will be noted that the anodes of the invention may, as a variant, comprise as binder:

an NBR with a high content of ACN crosslinked exclusively by thermal oxidation and optionally also via a radical route, and the combination of an NBR and an HNBR, each with a high content of ACN and both crosslinked exclusively by thermal oxidation (the peroxide crosslinking system included in the composition of anode I2 being optional).

To illustrate the effect of this final annealing at 240° C. and in air on the capacitive performance of the anodes I1 and I2 according to the invention prepared via a liquid route, absorbance measurements were taken by Fourier transform infrared spectroscopy (abbreviated as FTIR) as a function of the wavenumber.

To this end, a film constituted of the HNBR binder according to the invention (Zetpol® 0020) 100 µm thick was deposited on copper, and was treated for 30 minutes at 240° C. in air. This film was then studied by FTIR in "ATR" (attenuated total reflectance) mode. The single FIGURE shows the two spectra obtained S1 and S2 before and after this annealing, respectively.

Spectrum S2 after this annealing shows:

a slight decrease in the band at 2240 cm$^{-1}$, characteristic of nitrile groups —C≡N, the appearance of a band at about 1600 cm$^{-1}$ attributed to the appearance of C═C and C═N bonds, and the appearance of a band at about 1740 cm$^{-1}$ attributed to the appearance of C═O groups.

These bands are characteristic of the partial oxidation of the nitrile groups and of the crosslinking of the HNBR by oxidation/dehydration of these nitrile groups (which are markedly more numerous than the unsaturations derived from butadiene due to the high content of ACN in the HNBR).

Table 3 also shows that the anodes I'1 and I'2 prepared via a melt route according to the second embodiment of the invention, i.e. for which the binder is an HNBR with an ACN content of at least 40%, which was crosslinked by thermal oxidation during the decomposition of the sacrificial polymeric phase, has a capacity of greater than or equal to 200 mAh/g of anode even after five and ten cycles (capacity of at least 210 mAh/g), and also a cyclability of greater than 100% between the first and tenth cycles. These satisfactory results for the anodes I'1 and I'2 are in contrast with the impossibility of making the elastomeric film adhere to the collector for the anode C'3 (for which a mass fraction of sacrificial phase before extraction of only 25.1% was used, which is very much less than the 39.4% and 32%, respectively, used for the anodes I'1 and I'2).

The invention claimed is:

1. A polymeric composition for an electrode that is capable of forming a lithium-ion battery anode, the composition comprising an active material which comprises a graphite, an electrically conductive filler and a crosslinked elastomeric binder, wherein said crosslinked binder comprises at least one non-hydrogenated acrylonitrile-butadiene copolymer (NBR) and/or at least one said hydrogenated acrylonitrile-butadiene copolymer (HNBR) which each have a mass content of acrylonitrile-based units of greater than or equal to 40%, and wherein said crosslinked binder comprises the product of a thermal oxidation chemical reaction, under an atmosphere comprising oxygen at a partial pressure of oxygen of greater than $10^4$ Pa and at a temperature of between 200° C. and 300° C., of said at least one NBR and/or of said at least one HNBR in non-crosslinked form, of said active material and of said electrically conductive filler with the oxygen of said atmosphere.

2. The composition as claimed in claim 1, wherein the composition is free of a radical crosslinking system for crosslinking said at least one NBR and/or said at least one HNBR.

3. The composition as claimed in claim 1, wherein said crosslinked binder comprises a mass fraction inclusively between 70% and 100% of said at least one NBR and/or of said at least one HNBR, said crosslinked binder being present in the composition in a mass fraction of less than 5%.

4. The composition as claimed in claim 1, wherein said crosslinked binder comprises at least one HNBR which has an iodine number, measured according to the standard ASTM D5902-05, of greater than 10%.

5. The composition as claimed in claim 1, wherein said crosslinked binder comprises a mixture of said at least one NBR and of said at least one HNBR.

6. The composition as claimed in claim 1, wherein said mass content of acrylonitrile-based units is greater than or equal to 44%.

7. The composition as claimed in claim 1, wherein the composition comprises:
   in a mass fraction of greater than 90%, said active material comprising said graphite which is of artificial type, and
   in a mass fraction of between 1% and 6%, said electrically conductive filler which is chosen from the group constituted by carbon blacks, graphites, expanded graphites, carbon fibers, carbon nanotubes, graphenes, and mixtures thereof.

8. An electrode which is capable of forming a lithium-ion battery anode, wherein the electrode comprises at least one film constituted of a composition as claimed in claim 1, and a metal current collector in contact with said at least one film.

9. A lithium-ion battery comprising at least one cell including an anode, a cathode and an electrolyte based on a lithium salt and a nonaqueous solvent, wherein said anode is constituted of an electrode as claimed in claim 8.

10. A process for preparing a composition as claimed in claim 1, characterized in that the process successively comprises:
   a) mixing of ingredients of the composition comprising said active material, said elastomeric binder in non-crosslinked form and said electrically conductive filler, to obtain a precursor mixture of said composition,
   b) deposition of said mixture on a metal current collector so that said mixture forms a non-crosslinked film, and then
   c) thermal oxidation of said non-crosslinked film under an atmosphere comprising oxygen at a partial pressure of oxygen of greater than $10^4$ Pa and at a temperature of between 200° C. and 300° C., to obtain said electrode in which said binder is crosslinked.

11. The process as claimed in claim 10, characterized in that the following are performed:
   step a) by liquid-route grinding of said ingredients dissolved or dispersed in a solvent, and
   step c), after evaporation of said solvent following step b), by annealing said film.

12. The process as claimed in claim 10, characterized in that the following are performed:
   step a) by melt-route mixing of said ingredients and without evaporation of solvent, said ingredients also comprising a sacrificial polymeric phase in a mass fraction in said mixture of greater than or equal to 28%, and
   step c) by thermal decomposition of said sacrificial polymeric phase having a thermal decomposition temperature which is at least 20° C. below that of said binder, to at least partially remove said sacrificial polymeric phase.

13. The process as claimed in claim 12, wherein said sacrificial polymeric phase comprises at least one sacrificial polymer chosen from polyalkene carbonates and is present in said mixture in a mass fraction of between 30% and 50%, and in that step a) is performed in an internal mixer or an extruder without macro-phase separation between said binder and said sacrificial polymeric phase in said mixture, in which said binder is homogeneously dispersed in said sacrificial polymeric phase which is continuous or forms a co-continuous phase with said phase.

14. The composition as claimed in claim 3, wherein said crosslinked binder is present in the composition in a mass fraction of less than or equal to 4%.

15. The composition as claimed in claim 4, wherein said crosslinked binder comprises said at least one HNBR which has an iodine number, measured according to the standard ASTM D5902-05, of greater than 15%.

16. The composition as claimed in claim 6, wherein said mass content of acrylonitrile-based units is greater than or equal to 48%.

* * * * *